US006794588B2

(12) United States Patent
Lin

(10) Patent No.: US 6,794,588 B2
(45) Date of Patent: Sep. 21, 2004

(54) TWO-PART KEYBOARD

(75) Inventor: Wen-Kuan Lin, Taipei (TW)

(73) Assignee: Lite-On Technology Corporation, Taipei (TW)

(*) Notice: Subject to any disclaimer, the term of this patent is extended or adjusted under 35 U.S.C. 154(b) by 0 days.

(21) Appl. No.: 10/601,644

(22) Filed: Jun. 24, 2003

(65) Prior Publication Data

US 2004/0027335 A1 Feb. 12, 2004

(30) Foreign Application Priority Data

Aug. 12, 2002 (TW) ...................................... 91212438 U

(51) Int. Cl.[7] ................................................ G06F 1/16
(52) U.S. Cl. ...................................... 200/5 A; 361/680
(58) Field of Search ................................ 200/5 A, 517, 200/344, 345; 341/20, 22; 345/168, 173; 361/679, 680; 400/472–474, 489

(56) References Cited

U.S. PATENT DOCUMENTS

| | | | | |
|---|---|---|---|---|
| 3,940,758 A | * | 2/1976 | Margolin | 345/169 |
| 5,543,787 A | * | 8/1996 | Karidis et al. | 341/20 |
| 5,644,338 A | * | 7/1997 | Bowen | 345/168 |
| 6,111,527 A | * | 8/2000 | Susel | 341/22 |
| 6,262,881 B1 | * | 7/2001 | Karidis | 361/680 |
| 6,614,649 B1 | * | 9/2003 | Wang | 361/680 |
| 6,674,636 B2 | * | 1/2004 | Loo | 361/680 |

* cited by examiner

*Primary Examiner*—Michael A. Friedhofer
(74) *Attorney, Agent, or Firm*—Birch, Stewart, Kolasch & Birch, LLP

(57) ABSTRACT

A two-part keyboard separately connects to an electronic device to input data to the electronic device. The two-part keyboard includes first and second housings that respectively have a keyboard portion. The two-part keyboard also includes a base, a connector, and a controller for receiving and processing a signal. Two ends of the base respectively and movably connect to the first and second housings. Due to the connection between the base and the first and the second housings, the first and the second housings may move toward or backward. The controller electrically connects to the connector and the keyboard portions on the first and the second housings. The base is contained within the first and the second housings when the first and the second housings move toward to contact. The base is exposed between the first and the second housings to electrically connect to the electronic device.

17 Claims, 11 Drawing Sheets

TWO-PART KEYBOARD

This Application claims priority to Taiwan Patent Application No. 091212438 filed on Aug. 12, 2002.

FIELD OF INVENTION

The present invention is related to a two-part keyboard for separately connecting to an electronic device for inputting data to the electronic device.

BACKGROUND OF THE INVENTION

With the aggressive competition in the market, new techniques are constantly introduced into kinds of electronic devices. New products are developed to increase competitiveness in many fields, such as mobile phone, PDAs and electronic portable translators. Mobile phones are amongst others.

Besides the basic requirements "light, thin, short, small" for design, so far the development trends of the mobile phones are gradually moving to the goal of all-purpose-functions. Besides phone book, some of the mobile phones also function as a PDA to assist a user to manage personal data. In addition, some additional functions, such as internet browsing function, e-mail access function, e-dictionary or even multi-media function, strengthen the practicability and the convenience of the mobile phones.

Nevertheless, in contrast to the increasingly powerful additional functions of mobile phones, the original instant input interface for inputting phone number or short messages are obviously insufficient. The instant input interface referred to here are directed to method for user's instant input, excluding external (such as from PC) data loading wiredly or wirelessly. There are two most common input methods, one of them is to input by the intrinsic keyboard of the mobile phone, and the other is by voice recognition. They are all accomplished by means of recognition and possess certain convenience. However, when a great deal of information need to be input, it usually takes too much time. In addition, the accuracy of recognition also needs improving.

To deal with this problem, some mobile phones are equipped with a mini keyboard. The present invention is therefore directed to the further improvement of such keyboards so as to meet higher demands.

SUMMARY OF THE INVENTION

The main aspect of the present invention provides a two-part keyboard, which can be opened to both sides.

Another aspect of the present invention provides a two-part keyboard, which is connected to an electronic device by the connector located between the two keyboard parts. Data can be input into the electronic device by way of the two-part keyboard.

Still another aspect of the present invention provides a two-part keyboard, whose connector's height can be adjusted according to the available electronic devices.

Again another aspect of the present invention provides a two-part keyboard, which can be connected with different electronic devices by replacing or adjusting a base or the connector.

The two-part keyboard of the present invention includes a first housing, a second housing, a base, a controller and a connector. The first housing includes a first keyboard part and the inside of the first housing has a first space. A first outlet of the first space is on the right surface of the first housing. The second housing includes a second keyboard part and the inside of the second housing has a second space. A second outlet of the second space is on the left surface of the second housing.

The base has a left side part which movably connects to the first housing and a right side part which movably connects to the second housing. The controller for receiving and processing the input data is electrically connected with the first keyboard part and the second keyboard part. The connector for electrically connecting to the electronic device is installed on the base and electrically connecting to the controller.

When the first and the second housings move towards each other to conjoin, the left side part and the right side part of the base are respectively received in the first space and the second space via the first outlet and the second outlet. When the first and the second housings move away from each other, the left side part and the right side part respectively come off from the first space via the first outlet and from the second space via the second outlet. At this time, part of the base and the connector are exposed out of the first housing and the second housing to render the connector electrically connected to a electronic device.

BRIEF DESCRIPTION OF THE DRAWINGS

FIG. 2a is an explosive view of the embodiment of FIG. 1a.

FIG. 3a is a top view of the embodiment of FIG. 1a.

FIG. 4a is a cross-sectional view dissected along line I–I' of the embodiment of FIG. 1a.

DETAILED DESCRIPTION

Figure 1A:
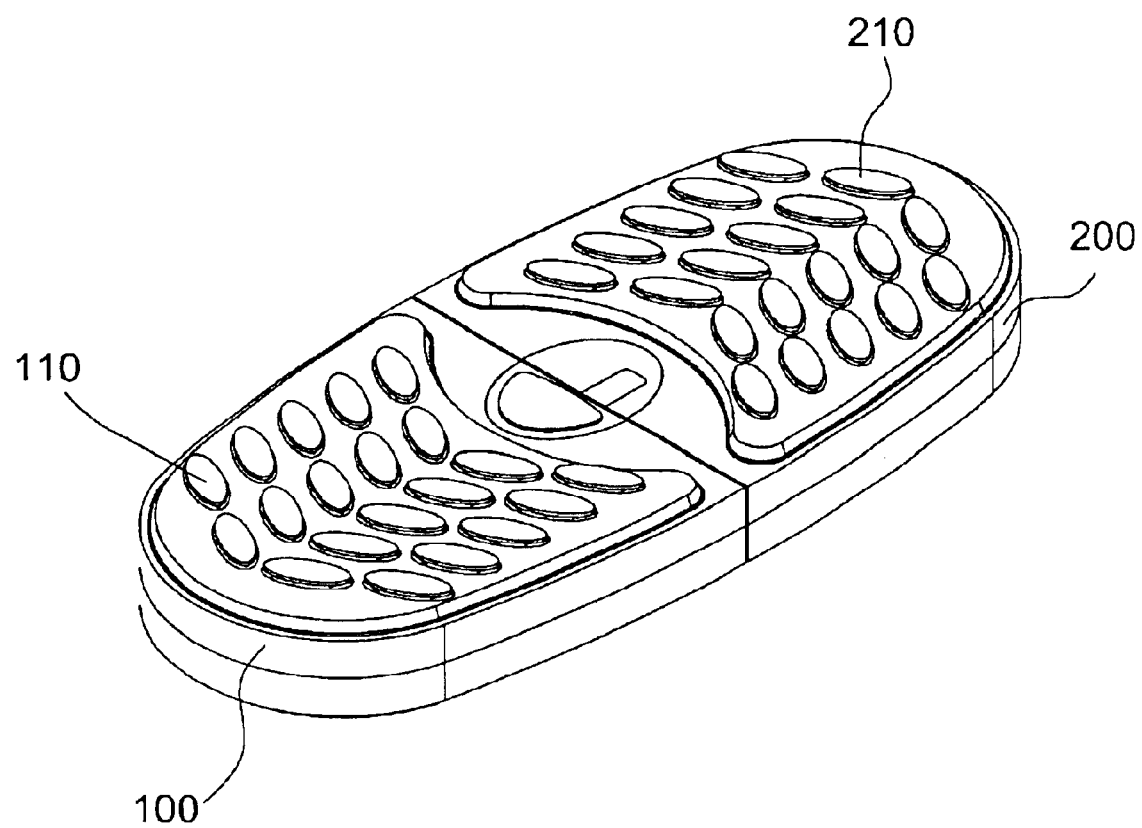
FIG. 1a is an illustrative diagram showing the two-part keyboard of the present invention when two sides of the keyboard partially conjoin.
Figure 1B:
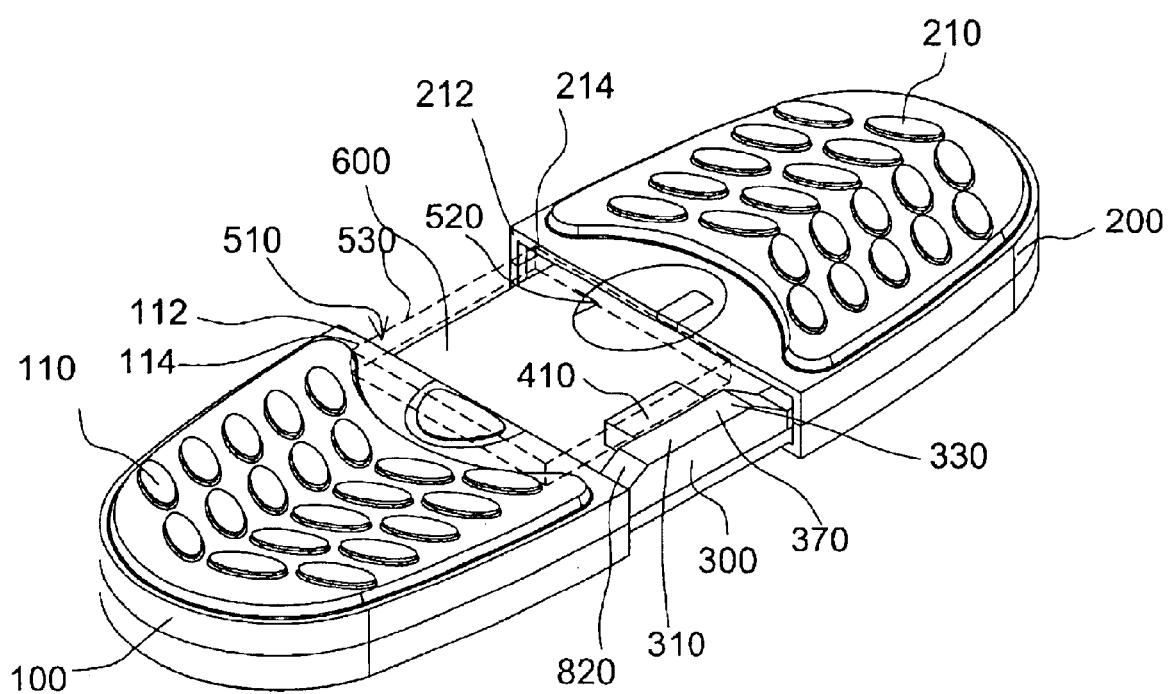
FIG. 1b is an illustrative diagram showing the two-part keyboard of FIG. 1a when two sides of the keyboard are drawn apart.
Figure 1C:
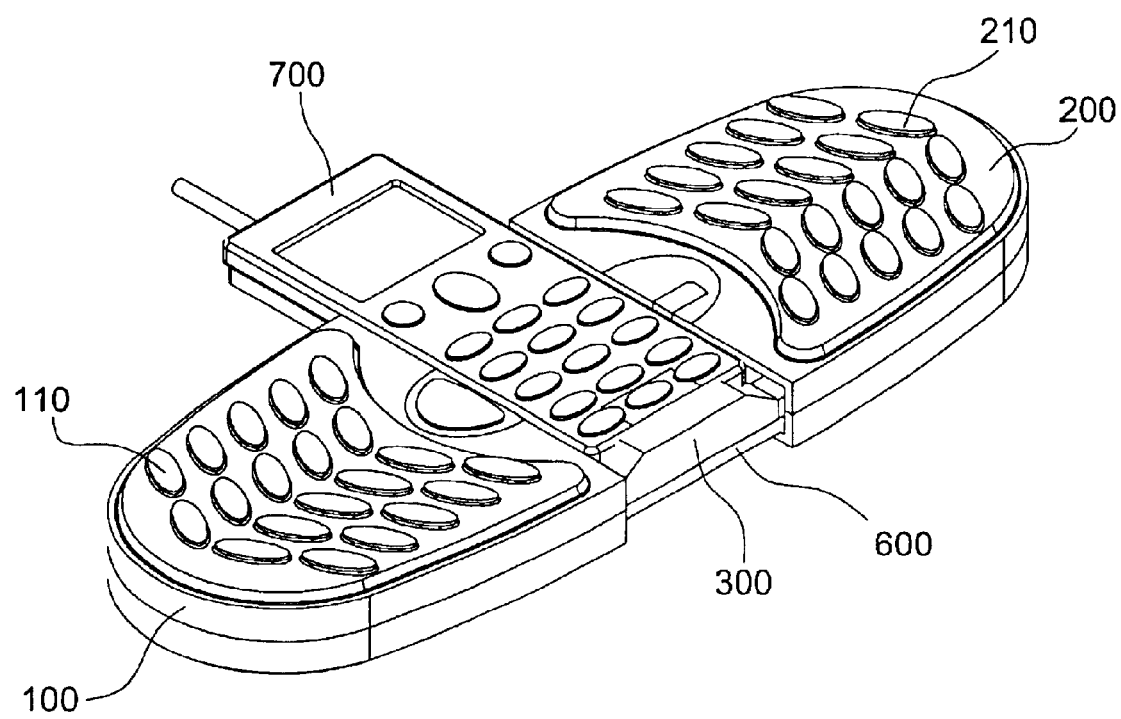
FIG. 1c is an illustrative diagram of embodiment when the embodiment of FIG. 1b connects to an electronic device.

The present invention provides a two-part keyboard, as shown in FIG. 1a. The two-part keyboard can be opened to both sides, as shown in FIG. 1b, for separatably connecting to an electronic device 700 for inputting data to the electronic device 700 via the two-part keyboard. FIG. 1c is an illustrative figure for the embodiment when the two-part keyboard of the present invention connects to the electronic device 700. For a preferred embodiment, the electronic device 700 mentioned here is a mobile phone, but not therefore limited to. It may be PDA, digital camera and any other similar acceptable electronic device in which data are input as well.

The two-part keyboard of the present invention includes a first housing 100, a second housing 200, a base 300, a controller 400 and a connector 410. As shown in FIG. 1a and 1b, the first housing 100 includes a first keyboard part 110, and the first keyboard part 110 includes at least one key. As far as an embodiment is concerned, the first keyboard part 110 is disposed on the upper surface of the first housing 100. However, the first keyboard part 110 may be also located on the sides or on the bottom surface of the first housing 100. As shown in FIG. 1b, the inside of the first housing 100 has a first space 510, and a first outlet 114 of the first space 510 is on the left side part 212 of the first housing 100.

As shown in FIGS. 1a and 1b, the second housing 200 includes a second keyboard part 210, which includes at least one key. As far as a embodiment is concerned, the second keyboard part 210 is disposed on the upper surface of the second housing 200. However, the second keyboard part 210 may be also located on the sides or on the bottom surface of the first housing 200. As shown in FIG. 1b, the inside of the second housing 200 has a second space 520, and a second outlet 214 of the second space 520 is on the left side part 212 of the second housing 200.

As far as the preferred embodiment is concerned, the first keyboard part 110 and the second keyboard part 210 respectively have a single layer membrane circuit. However, in other embodiments, the first keyboard part 110 and the second keyboard part 210 may also respectively have a printed circuit or triple layer membrane circuit. The structure of the keys on the first keyboard part 110 and the second keyboard part 210 may be elastic rubber structure, scissor structure, spring leaf structure and any other structure that provides similar functions.

As shown in FIG. 1b, base 300 has left side part 310 and right side part 330. The left side part 310 movably connects to first housing 100. Apropos of embodiments, left side part 310 movably connects to the inner wall of the first space 510 through first outlet 114 and right side part 330 movably connects to second housing 200. As far as the embodiment is concerned, right side part 330 movably connects to the inner wall of the second space 520 through second outlet 214. By means of base 300, the first housing 100 and the second housing 200 may slide toward each other or away from each other.

Figure 2A:
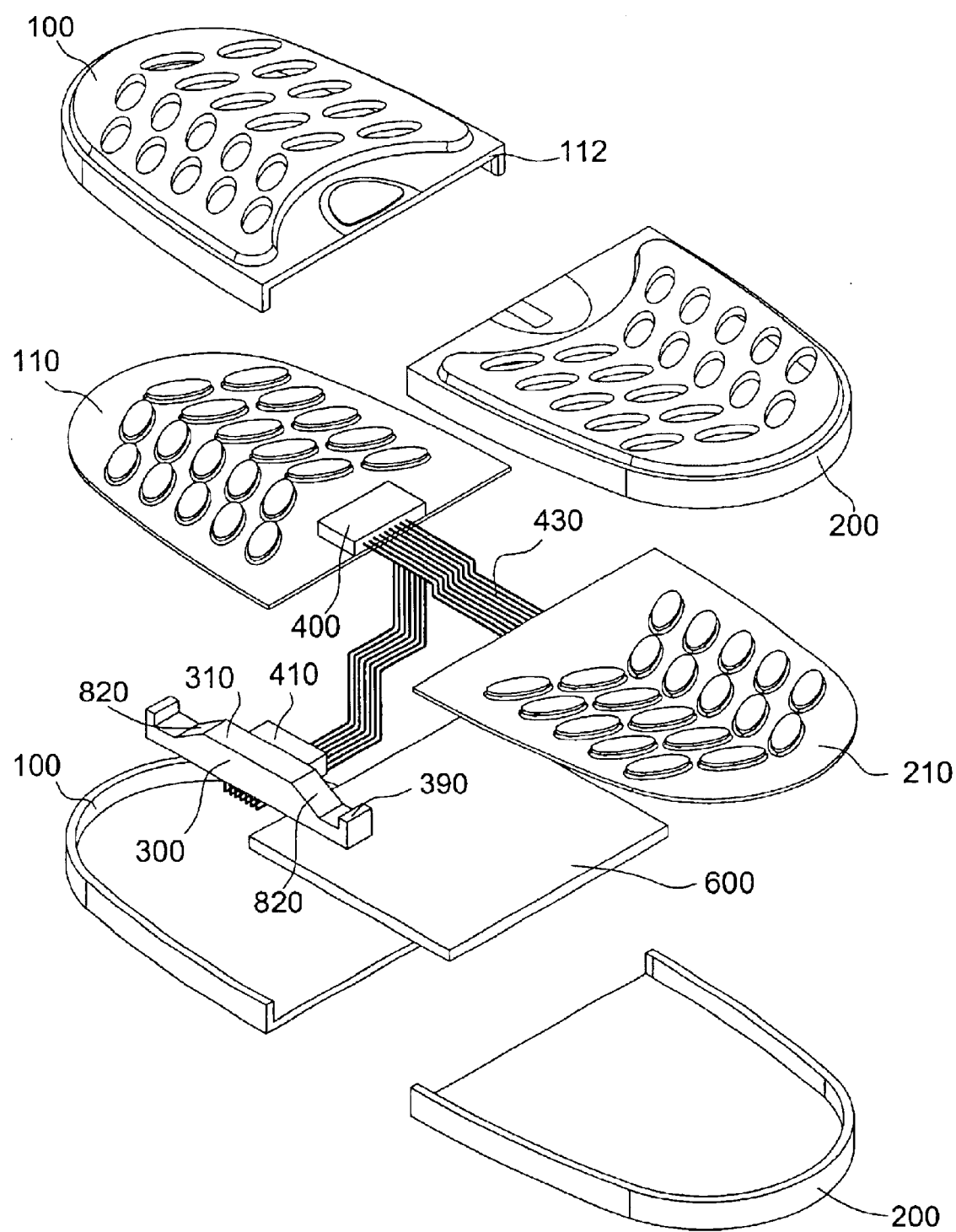
Figure 2B:
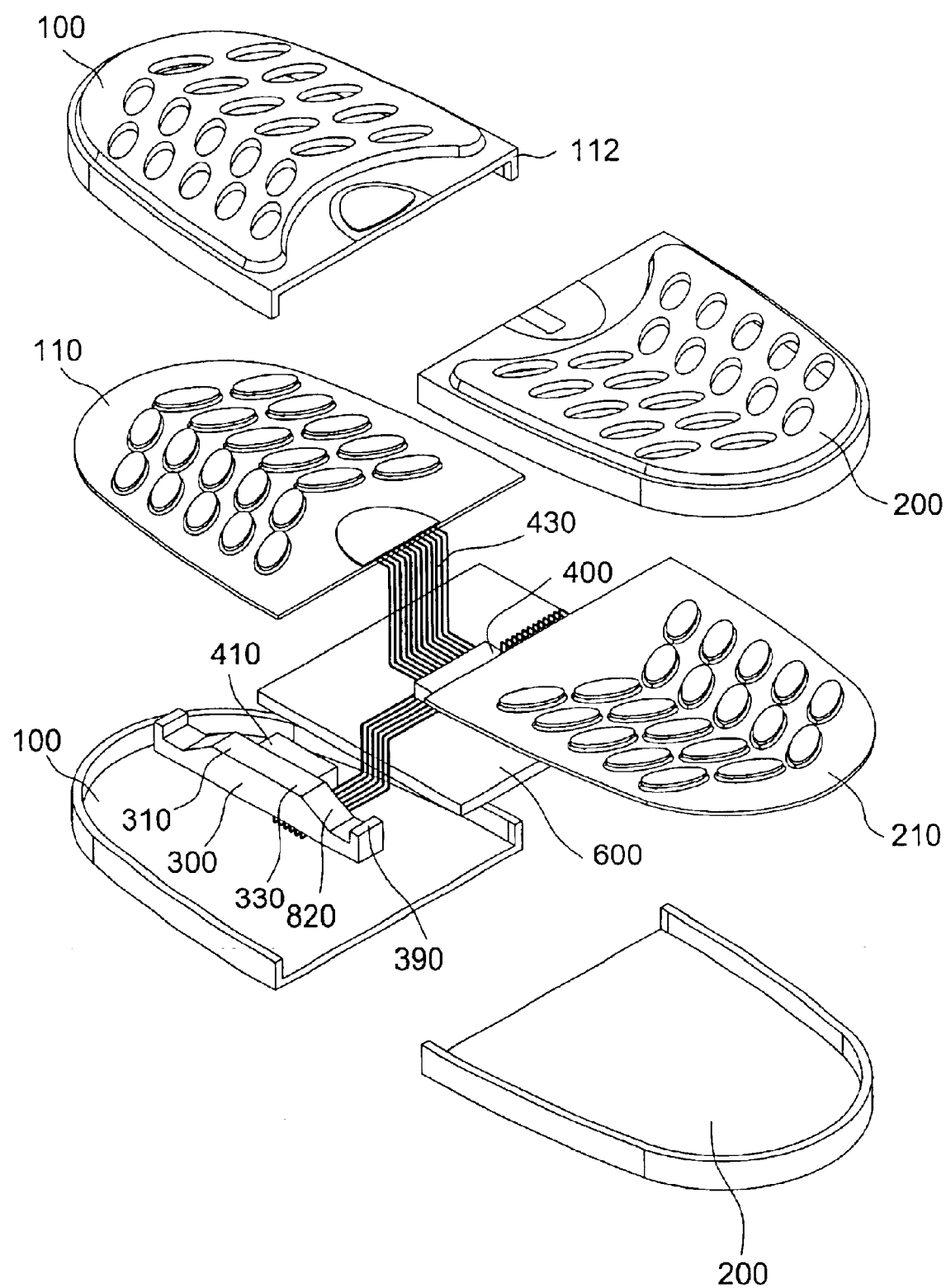
FIG. 2b is an explosive view of another embodiment of the present invention.

FIG. 2a is an explosive view of the present invention. As shown in FIG. 2a, controller 400 is electrically connects to the first keyboard part 110 and the second keyboard part 210 for receiving and processing the input data from the first keyboard part 110 and the second keyboard part 210. As far as the embodiment in FIG. 2a is concerned, controller 400 is disposed on the first keyboard part 110 or the second keyboard part 210. Nevertheless, controller 400 may also be installed on a back plate 600 beneath base 300, as shown in FIG. 2b, or independently installed on the first housing 100 or the second housing 200. In addition, as shown in FIGS. 2a and 2b, controller 400 is respectively electrically connects to the first keyboard part 110 and the second keyboard part 210. Alternatively, the first keyboard part 110 may also electrically connect to controller 400 via the second keyboard part 210, or the second keyboard part 110 may also electrically connect to controller 400 via the first keyboard part 210.

As far as the preferred embodiment is concerned, controller 400 is IC. Alternatively, controller 400 may be printed circuit, transistor or any other that provides similar functions as well. In this embodiment, controller 400 electrically connects to the first keyboard part 110 and the second keyboard part 210 via cable 430. Nevertheless, controller 400 may also electrically connect to the first keyboard part 110 and the second keyboard part 210 via other means of connection, such as wires, thin film circuit or printed circuit.

As shown in FIGS. 2a and 2b, connector 410 is installed on base 300 and electrically connects to controller 400. Connector 410 separatably electrically connects to the electronic device, and transmits the input data from controller 400 to the electronic device. Apropos of the embodiment, connector 410 electrically connects to the electronic devoice via a connecting slot (not shown here) inserted in the electronic device. To be especially noted, the two-part keyboard of the present invention may connect to different types of electronic devices by replacing different connectors 410.

Figure 3A:
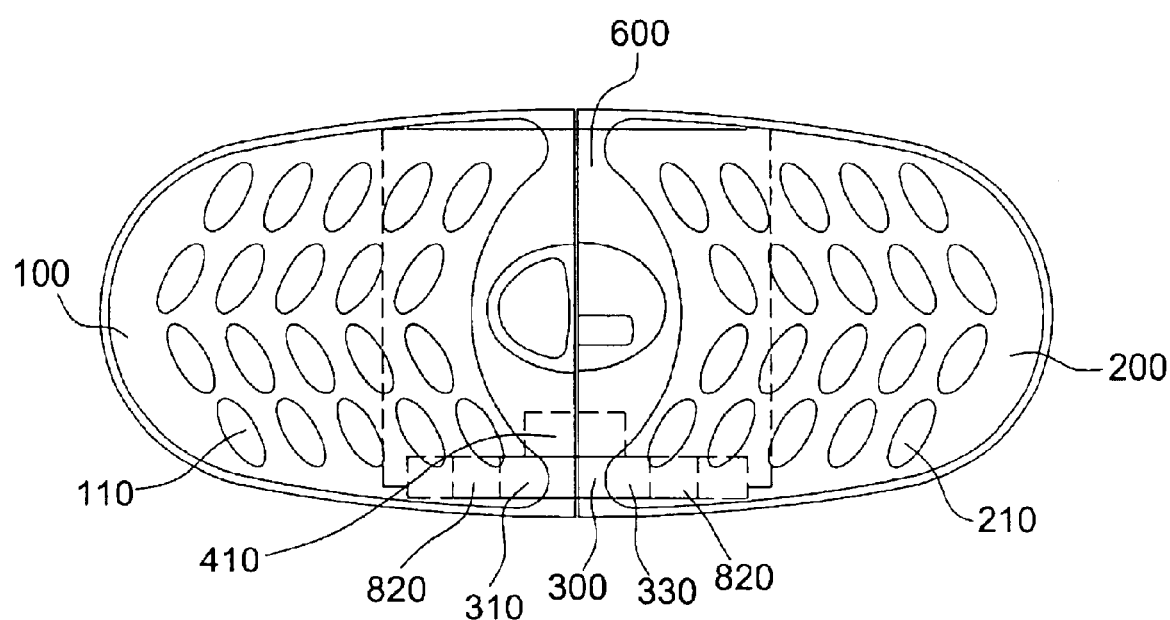

FIG. 3a is a top view of the embodiment when the first housing 100 and the second housing 200 conjoin. As shown in FIGS. 1b and 3a, when the first housing 100 and the second housing 200 slide toward each other to conjoin, the left part 310 of base 300 is received in the first space 510 via the first outlet 114, and right part 330 of base 300 is received in the second space 520 via the second outlet 214.

Figure 3B:
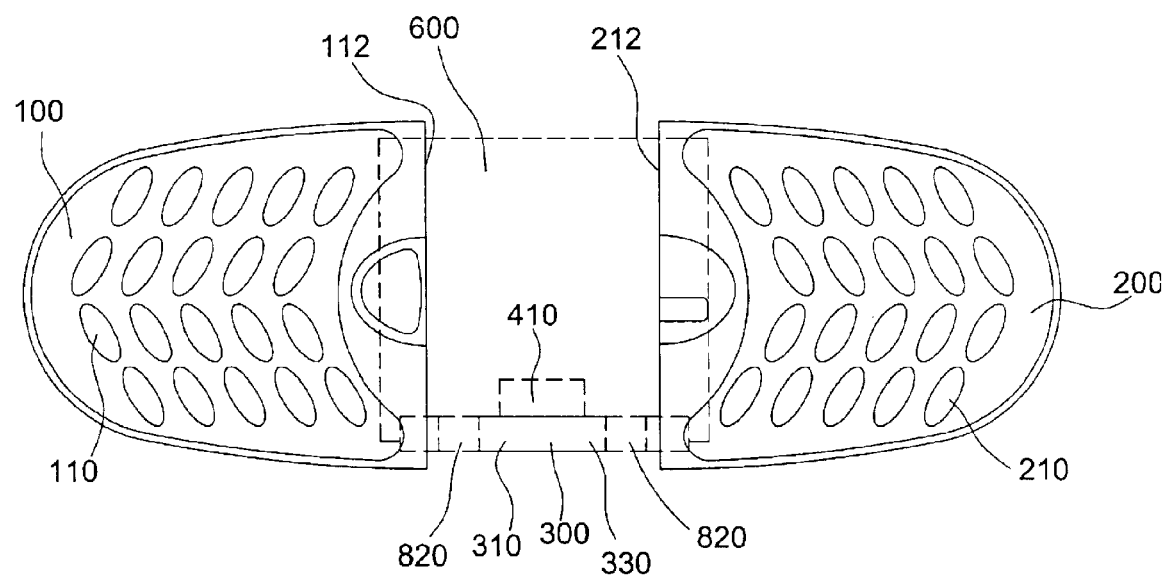
FIG. 3b is a top view of the embodiment of FIG. 1b.

FIG. 3b is a top view of the embodiment when the first housing 100 and the second housing 200 slide away from each other. As shown in FIGS. 1b and 3b, when the first housing 100 and the second housing 200 respectively slide away from each other, a part of left part 310 departs from the first space 510 via the first outlet 114, and a part of right part 330 departs from the second space 520 via the second outlet 214. At this time, connector 410 and a part of base 300 are exposed out of the first housing 100 and the second housing 200, and situated between a right side part 112 of the first housing 100 and a left side part 212 of the second housing 200. Connector 410 now electrically connects to the electronic device 700.

As far as the embodiment is concerned, side surfaces, which are near both end surfaces, of base 300 respectively have protrusions 390 which are perpendicular to the move direction of the first housing 100 or the second housing 200, as shown in FIGS. 2a and 2b. When the first housing 100 and the second housing 200 slide away from each other to a determined position, protrusions 390 respectively engage with the first housing 100 and the second housing 200 so as to render base 300 not to detach from the first outlet 114 and the second outlet 214. However, in another embodiment (not shown here), it is also possible that the first housing 100 and the second housing 200 respectively have protrusions 390, and base 300 has slot. When the first housing 100 or the second housing 200 slide away from each other to a determined position, protrusions 390 respectively engage with the slot of base 300 so as to render base 300 not to detach from the first outlet 114 and the second outlet 214.

Figure 3C:
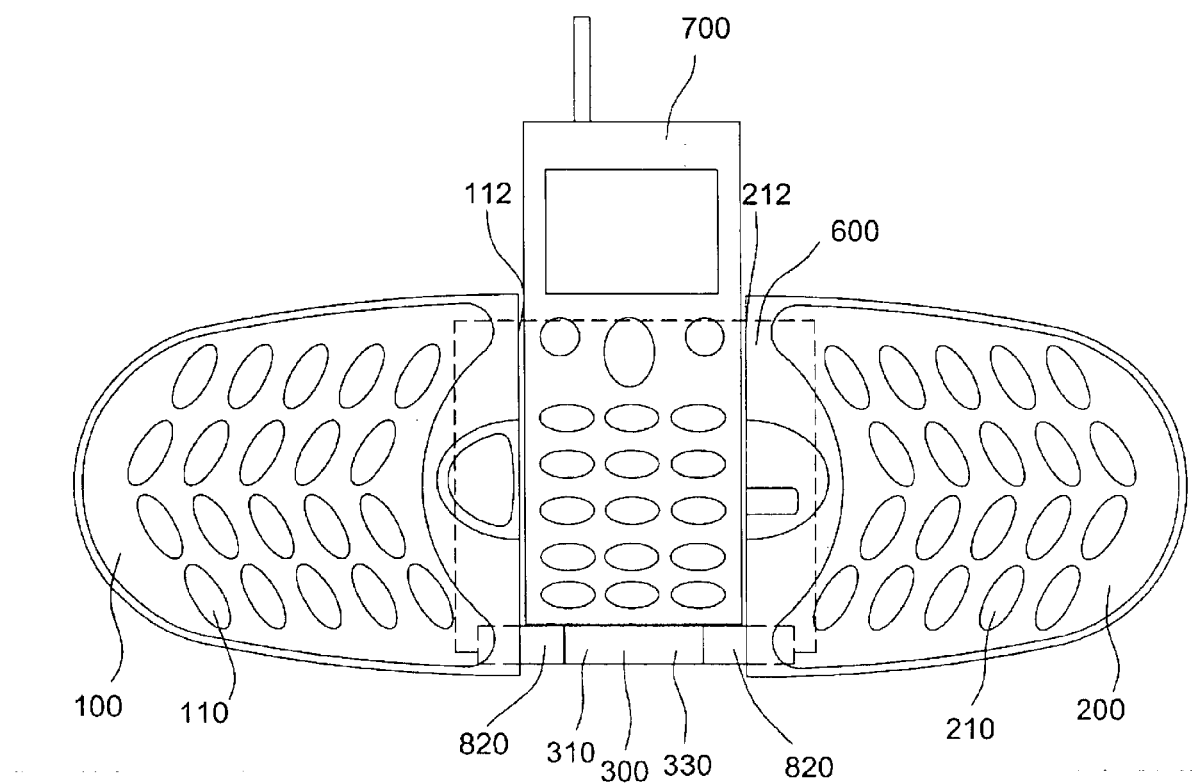
FIG. 3c is a top view of the embodiment of FIG. 1c.

As shown in FIGS. 3b and 3c, when connector 410 is exposed between the right side part 112 and the left side part 212, connector 410 may electrically connect to the electronic device 700. Apropos of embodiments, the electronic device 700 connects to connector 400 via a connecting slot in a direction that is parallel to the upper surface of the first housing 100 or the second housing 200 and simultaneously parallel to the right side part 112 or the left side part 212. Besides, when the electronic device 700 electrically connects to connector 410, the electronic device 700 is parallel to the upper surface of the first housing 100 or the second housing 200. However, the electronic device 700 may connect to connector 410 in other direction as well, and when the electronic device 700 electrically connects to connector 410, the electronic device 700 may also be parallel to a surface that sandwiches a certain angle with respect to the upper surface of the first housing 100 or the second housing 200.

As shown in FIGS. 1b, 2a and 2b, the two-part keyboard of the present invention further includes a back plate 600. One end of back plate 600 movably connects to the first housing 100 and the other end may movably connect to the second housing 200 as well. In addition, back plate 600 is situated beneath base 300. Apropos of embodiments, back plate 600 movably connects to the inner walls of the first space 510 and the second wall 520 respectively via the first outlet 114 and the second outlet 214. However, in another embodiment, respectively via bottom, back plate 600 may also movably connect to bottom surfaces of the first housing 100 and the second housing 200.

As shown in FIGS. 1b and 3b, when the first housing 100 and the second housing 200 slide away from each other, a part of back plate 600 is exposed between the right side part 112 of the first housing 100 and the left side part 212 of the second housing 200. Now, back plate 600 together with the right side part 112 and the left side part 212 define a third space 530. As shown in FIG. 3c, when the electronic device 700 electrically connects to connector 410, a part of the electronic device 700 is received in the third space 530, and back plate 600 touches a back side of the electronic device 700 for supporting the electronic device 700.

Figure 4A:
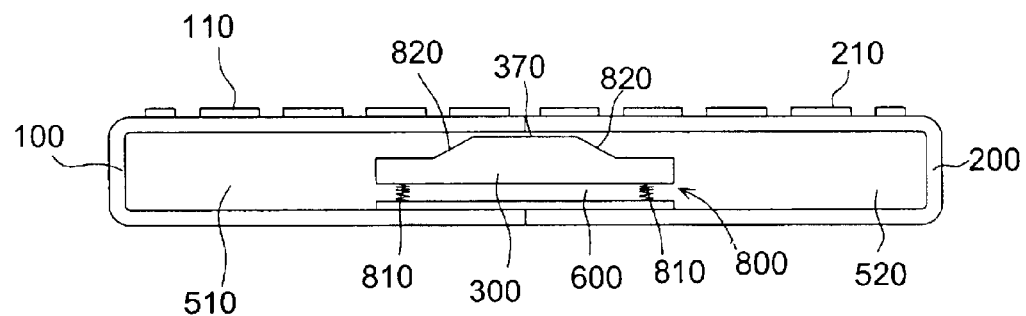
Figure 4B:
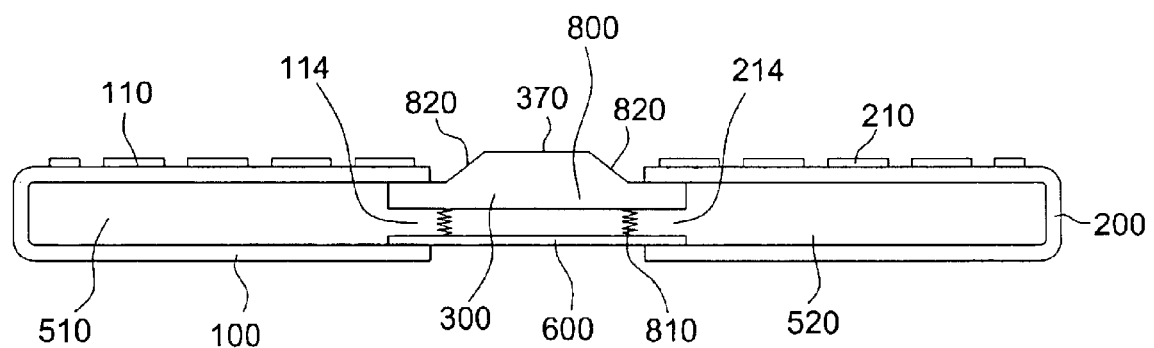
FIG. 4b is a cross-sectional view dissected along line I–I' of the embodiment of FIG. 1b.

Please refer to FIGS. 4a and 4b. As shown in FIG. 4a, the two-part keyboard of the present invention further includes an elevating device 800. When the first housing 100 and the second housing 200 slide away from each other, as shown in FIG. 4b, elevating device 800 lifts base 300 upwards. Apropos of embodiments, the two-part keyboard of the present invention may connect to electronic devices of different thickness by replacing or adjusting elevating device 800 or base 300.

As far as the embodiments in FIGS. 4a and 4b are concerned, elevating device 800 includes at least an elastic element 810. One end of elastic element 810 connects to base 300 with the other connecting to back plate 600. When the first housing 100 and the second housing 200 slide away from each other, base 300 lifts up via the elastic force of elastic element 810. Apropos of embodiments, elastic element 810 may be spring, elastic rubber, sponge, or any other that provides similar functions.

Besides, as shown in FIGS. 4a and 4b, the upper surfaces 370 of the left part and the right part of base 300 respectively have incline surfaces 820. The incline surfaces 820 simultaneously incline downwards and outwards. Because elastic element 810 provides base 300 with a upward elastic force, the incline surfaces 820 respectively touch the upper edge of the first outlet 114 and the upper edge of the second outlet 214 when the first housing 100 and the second housing 200 slide away from each other. Now the upper edge of the first outlet 114 and the upper edge of the second outlet 214 respectively slide outwards along the incline surfaces 820. As shown in FIG. 4b, base 300 gradually rises via the inclination of the incline surfaces 820 relative to the first housing 100 and the second housing 200. When the first housing 100 and the second housing 200 slide towards each other, the upper edge of the first outlet 114 and the upper edge of the second outlet 214 respectively slide along the incline surfaces 820 forcing base 300 to move downwards.

Figure 5A:
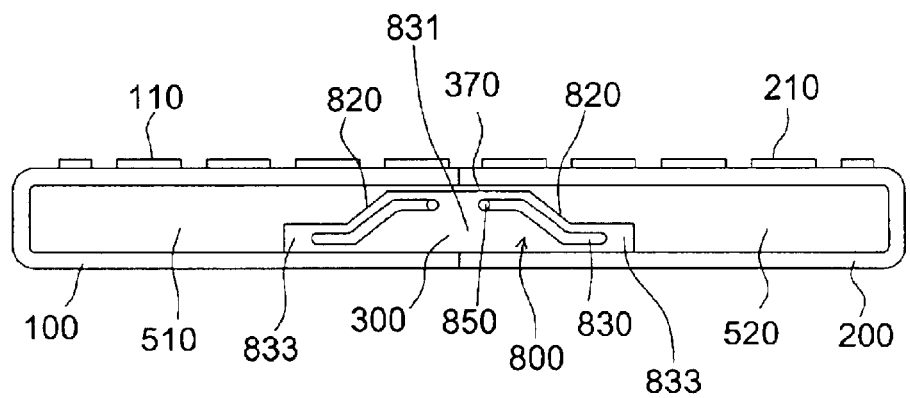
FIG. 5a is a cross-sectional view dissected along line I–I' of another embodiment of present invention when two sides of the keyboard partially conjoin.
Figure 5B:
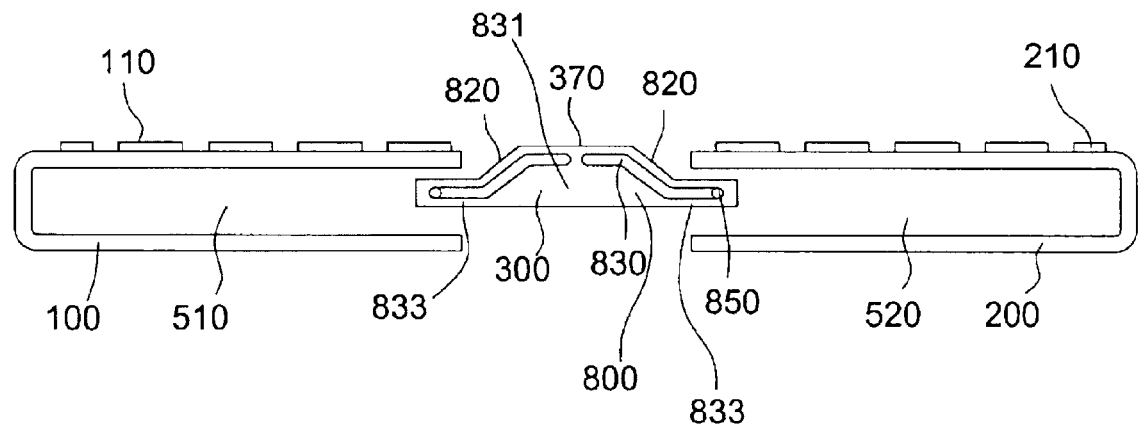
FIG. 5b is a cross-sectional view dissected along line I–I' of the embodiment of FIG. 5a of present invention when two sides of the keyboard are drawn apart

FIGS. 5a and 5b show another embodiment of elevating device 800. As shown in FIG. 5a, elevating device 800 includes slot 830 and axle 850. Slot 830 is located on bottom surface of base 300. Slot 830 includes a central part 831 which is near the center of bottom surface and an outer part 833 which is near two sides of bottom face. The central part 831 is closer to the upper surface 370 of base 300 than the outer part 833. One end of axle 850 connects to the inner wall of the first housing 100 or the second housing 200, with the other end being sleeved into slot 830.

As shown in FIG. 5a, when the first housing 100 or the second housing 200 slides toward the center of base 300, axle 850 travels along slot 830 from the outer part 833 of slot 830 to central part 831 for guiding downward movement of base 300. When the first housing 100 or the second housing 200 slides away from each other, axle 850 moves to outer part 833 from central part 831 of slot 830 for guiding upward movement of base 300. However, in another embodiment, axle 850 may connect to base 300 and slot 830 is situated on inner side of the first housing 100 or the second housing 200.

The two-part keyboard of the present invention further includes a synchronizing device 900. Synchronizing device 900 respectively connects to the first housing 100 and the second housing 200. Via synchronizing device 900, the first housing 100 and the second housing 200 may slide away from each other at equal speed. As the embodiment shown in FIG. 6, synchronizing device 900 includes a first rack 910, a second rack 920 and a gear 930. First rack 910 connects to the first housing 100 and is parallel to the sliding direction of the first housing 100. Second rack 920 connects to the second housing 200 and is parallel to the sliding direction of the second housing 200. Gear 930 rotatably connects to back plate 600. The first rack 910 and the second rack 920 respectively engage with two ends of a same diameter of gear 930. When the first housing 100 slides inwards, the first rack 910 drives gear 930 to rotate, which drives the second rack 920 to render the second housing 200 to slide inwards at a speed equal to a speed of the first housing 100. When the first housing 100 slides outwards, the first rack 910 drives gear 930 to rotate, which drives the second rack 920 to render the second housing 200 to slide outwards at a speed equal to a speed of the first housing 100.

Figure 6:
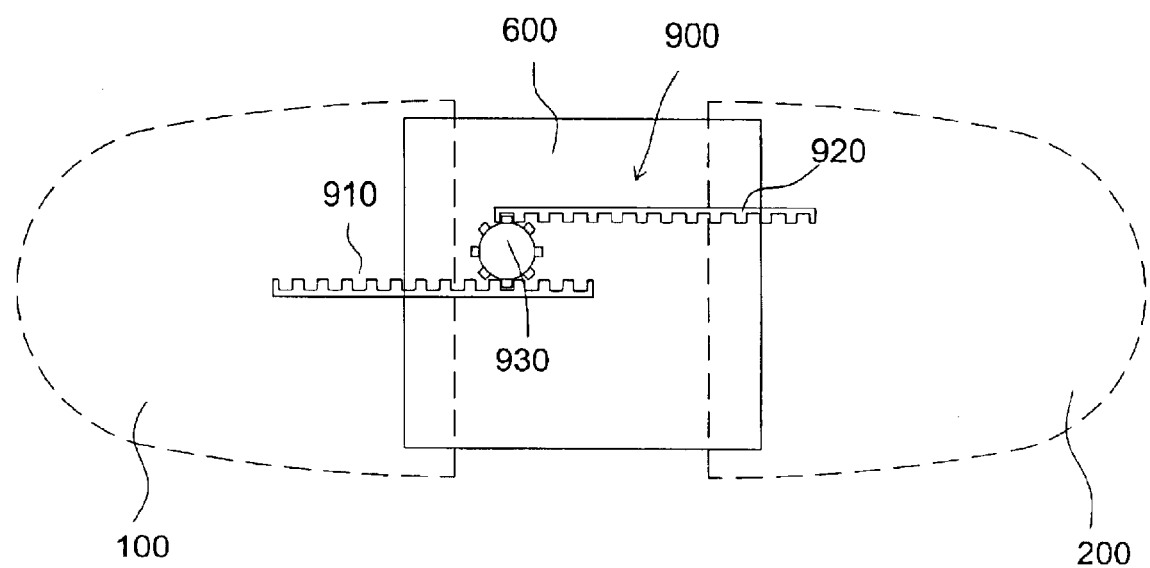
FIG. 6 is an embodiment of the synchronizing device of the two-part keyboard.

To be particularly noted, FIG. 6 illustrates merely one of the possible embodiments of synchronizing device 900. In other words, synchronizing device 900 may also be embodied via any other elemental combination which accomplishes equal efficacy.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore as much as broadly apply.

What is claimed is:

1. A two-part keyboard for separatably connecting to an electronic device for inputting data, said keyboard comprising:
   a first housing, said first housing having a first keyboard part, said first keyboard part comprising at least a key, an inner part of said first housing forming a first space, said first space having a first outlet located on a right-side of said first housing;

a second housing, said second housing having a second keyboard part, said second keyboard part comprising at least a key, an inner part of said second housing forming a second space, said second space having a second outlet located on a left-side of said second housing;

a base, a left side part of said base movably connecting to said first housing, a right side part of said base movably connecting to said second housing, said first and said second housings moving towards each other or away from each other via the connection between said base, said first and said second housing;

a controller for processing an input signal coming from said first and said second keyboard parts, said controller electrically connecting to said first and said second keyboard parts; and a connector for separatably and electrically connecting to said electronic device, said connector electrically connecting to said controller for transferring said input signal to said electronic device, said connector being installed in said base;

wherein, when said first and said second housings move towards each other, said left side part of said base is received in said first space via said first outlet and said right side part of said base is received in said second space via said second outlet and, when said first and said second housings move away from each other, said connector is exposed to between said right side part of said first housing and said left side part of said second housing for electrically connecting to said electronic device.

2. The two-part keyboard of claim 1, further comprising a back plate, said back plate movably connecting to said first and said second housings, and when said first and said second housings move away from each other, said back plate is located between said base and exposed between said right side part and said left side part, and said back plate together with said right side part and said left side part defines a third space for receiving a part of said electronic device and, when said electronic device electrically connects to said connector, said back plate contacts a back side of said electronic device for supporting said electronic device.

3. The two-part keyboard of claim 1, further comprising an elevating device, and when said first and said second housings move away from each other, said elevating device lifts said base upwards.

4. The two-part keyboard of claim 3, wherein said elevating device comprises at least one elastic element with one end thereof connecting to said base, the other end of said elastic element connecting to a back plate, said back plate being situated beneath said base and slidably connecting to said first and said second housings.

5. The two-part keyboard of claim 3, wherein said elevating device comprises:

a slot situated on a bottom face of said base, said slot having a central part, near a center of said base, and an outer part, near two sides of said bottom face, said central part being closer to an upper surface of said base than said outer part;

an axle, one end of said axle selectively connecting to an inner side of a bottom panel of said first and said second housings, with the other end of said axle being sleeved into said slot;

wherein when said first or said second housing slides away from said base, said axle moves to said outer part from said central part of said slot for guiding upward movement of said base, and, when said first or said second housing slides toward the center of said base, said axle travels along said slot from said outer part to said central part for guiding downward movement of said base.

6. The two-part keyboard of claim 3, wherein said elevating device comprises:

a slot selectively situated on an inner side of a bottom panel of said first and said second housings, said slot having a central part, near said outlet and, an outer part, distant from said outlet, said central part being closer to an upper surface of said first or said second housing than said outer part;

an axle, one end of said axle connecting to a bottom side of said base with the other end of said axle being sleeved into said slot;

wherein when said first or said second housing slides away from said base, said axle moves from said central part of said slot to said outer part for guiding upward movement of said base and, when said first or said second housing slides toward the center of said base, said axle travels along said slot from said outer part to said central part for guiding downward movement of said base.

7. The two-part keyboard of claim 1, wherein an upper surface of said left side part and an upper surface of said right side part of said base respectively comprises an outward and downward incline surface, and, when said first and said second housings move toward each other, one edge of said first outlet and one edge of said second outlet respectively slide along said incline surface forcing said base to move downwards.

8. The two-part keyboard of claim 1, further comprising a synchronizing device respectively connecting to said first and said second housings to render said first and said second housings to slide away from each other at equal speed.

9. The two-part keyboard of claim 8, wherein said synchronizing device comprises:

a back plate movably connecting to said first and said second housings, said first and said second housings sliding towards or away from each other via said back plate;

a first rack connecting to said first housing, said first rack being parallel to a sliding direction of said first housing;

a second rack connecting to said second housing, said second rack being parallel to a sliding direction of said second housing; and a gear rotatably connecting to said back plate, said first rack and said second rack respectively engaging with two ends of a same diameter of said gear;

wherein, when said first housing slides inwards, said first rack drives said gear to rotate making said second rack to render the second housing to slide inwards at a speed equal to a speed of said first housing, and, when said first housing slides outwards, said first rack drives said gear to rotate making said second rack to render the second housing to slide outwards at a speed equal to a speed of said first housing.

10. A two-part keyboard for separately connecting to an electronic device for inputting data, said keyboard comprising:

a first housing, said first housing having a first keyboard part, said first keyboard part having at least a key, an inner part of said first housing forming a first space, said first space having a first outlet located on a right-side of said first housing;

a second housing, said second housing having a second keyboard part, said second keyboard part having at least a key, an inner part of said second housing forming a second space, said second space having a second outlet located on a left-side of said second housing;

a base, a left side part of said base movably connecting to said first housing, a right side part of said base movably connecting to said second housing;

a back plate movably connecting to said first and said second housing, said back plate being located beneath said base, and when said electronic device electrically connects to said connector, said back plate contacts a back side of said electronic device for supporting said electronic device;

a controller for processing a input signal coming from said first and said second keyboard parts, said controller electrically connecting to said first and said second keyboard parts; and a connector for separatably and electrically connecting to said electronic device, said connector electrically connecting to said controller for transferring said input signal to said electronic device, said connector being installed in said base;

wherein, said first and said second housings move towards each other or outwards via said base and via said back plate, when said first and said second housings move towards each other, said left side part of said base is received in said first space via said first outlet and said right side part of said base is received in said second space via said second outlet, and, when said first and said second housings move away from each other, said connector is exposed between said right side part of said first housing and said left side part of said second housing for electrically connecting to said electronic device.

11. The two-part keyboard of claim 10, further comprising an elevating device, and when said first and said second housings move away from each other, said elevating device lifts said base upwards.

12. The two-part keyboard of claim 11, wherein said elevating device comprises at least one elastic element with one end thereof connecting to said base and the other end of said elastic element connecting to a back pane.

13. The two-part keyboard of claim 11, wherein said elevating device comprises:

a slot situated on a bottom face of said base, said slot having a central part, near a center of said base, and an outer part, near the two sides of said bottom face, said central part being closer to a surface of said base than said outer part;

an axle, one end of said axle selectively connecting to an inner side of a bottom panel of said first and said second housings with the other end of said axle being sleeved into said slot;

wherein when said first or said second housing slides away from said base, said axle moves to said outer part from said central part of said slot for guiding upward movement of said base, and, when said first or said second housing slides toward the center of said base, said axle travels along said slot from said outer part to said central part for guiding downward movement of said base.

14. The two-part keyboard of claim 11, wherein said elevating device comprises:

a slot selectively situated on an inner side of a bottom panel of said first and said second housings, said slot having a central part, near said outlet and, an outer part, distant from said outlet, said central part being closer to a surface of said first or said second housing than said outer part;

an axle, one end of said axle connecting to a bottom side of said base with the other end of said axle being sleeved into said slot;

wherein when said first or said second housing slides away from said base, said axle moves from said central part of said slot to said outer part for guiding upward movement of said base, and when said first or said second housing slides toward the center of said base, said axle travels along said slot from said outer part to said central part for guiding downward movement of said base.

15. The two-part keyboard of claim 10, wherein a surface of said left side part and a surface of said right side part of said base respectively comprises an outward and a downward incline surface, and, when said first and said second housings move towards each other, one edge of said first outlet and one edge of said second outlet respectively slide along said incline surface forcing said base to move downwards.

16. The two-part keyboard of claim 10, further comprising a synchronizing device respectively connecting to said first and said second housings to render said first and said second housings to slide away from each other at equal speed.

17. The two-part keyboard of claim 16, wherein said synchronizing device comprises:

a first rack connecting to said first housing, said first rack being parallel to a sliding direction of said first housing;

a second rack connecting to said second housing, said second rack being parallel to a sliding direction of said second housing; and a gear rotatably connecting to said back plate, said first rack and said second rack respectively engaging with two ends of a same diameter of said gear;

wherein, when said first housing slides inwards, said first rack drives said gear to rotate making said second rack to render the second housing to slide inwards at a speed equal to a speed of said first housing, and, when said first housing slides outwards, said first rack drives said gear to rotate making said second rack to render the second housing to slide outwards at a speed equal to a speed of said first housing.

* * * * *